United States Patent [19]
Richardson

[11] Patent Number: 5,343,789
[45] Date of Patent: Sep. 6, 1994

[54] THROUGH HOLE AND BAR FEED SUPPORT

[75] Inventor: William F. Richardson, Solon, Ohio

[73] Assignee: SP/Sheffer Incorporated, Solon, Ohio

[21] Appl. No.: 861,945

[22] Filed: Apr. 2, 1992

[51] Int. Cl.⁵ ............................................. B23B 13/08
[52] U.S. Cl. ..................................... 82/163; 82/127; 414/17
[58] Field of Search ................. 82/124, 126, 127, 163, 82/164; 414/14, 15, 17, 18, 16

[56] References Cited

U.S. PATENT DOCUMENTS

| | | | |
|---|---|---|---|
| 3,557,971 | 1/1971 | Tomiyama | 414/17 |
| 3,596,545 | 8/1971 | Eisenhardt | 82/127 |
| 4,034,632 | 7/1977 | Lohner | 82/127 |
| 4,149,437 | 4/1979 | Winberg et al. | 82/163 |
| 4,163,403 | 8/1979 | Argereu | 82/163 |
| 4,187,748 | 2/1980 | Evans | 414/15 |
| 4,631,995 | 12/1986 | Vroenen | 82/164 |
| 4,634,323 | 1/1987 | Wagner et al. | 82/163 |
| 4,672,869 | 6/1987 | Hasslauer et al. | 414/17 |

FOREIGN PATENT DOCUMENTS

| | | | |
|---|---|---|---|
| 986607 | 1/1983 | U.S.S.R. | 82/124 |

Primary Examiner—William E. Terrell
Attorney, Agent, or Firm—Price, Heneveld, Cooper, DeWitt & Litton

[57] ABSTRACT

A machine tool having a stock holding and supporting grip which is spaced from the stock clamping chuck and which provides an equally applied gripping pressure at circumferentially spaced locations about the stock, preferably applied by hydraulic gripping elements. The grip accommodates eccentricities and deviations in the stock, and prevents increase in such eccentricities during rotation of the stock during machining which would otherwise arise due to centrified forces acting on the protruding tail of the stock, thus preventing bowing and whipping of the unworked tail and of the stock while machining.

11 Claims, 3 Drawing Sheets

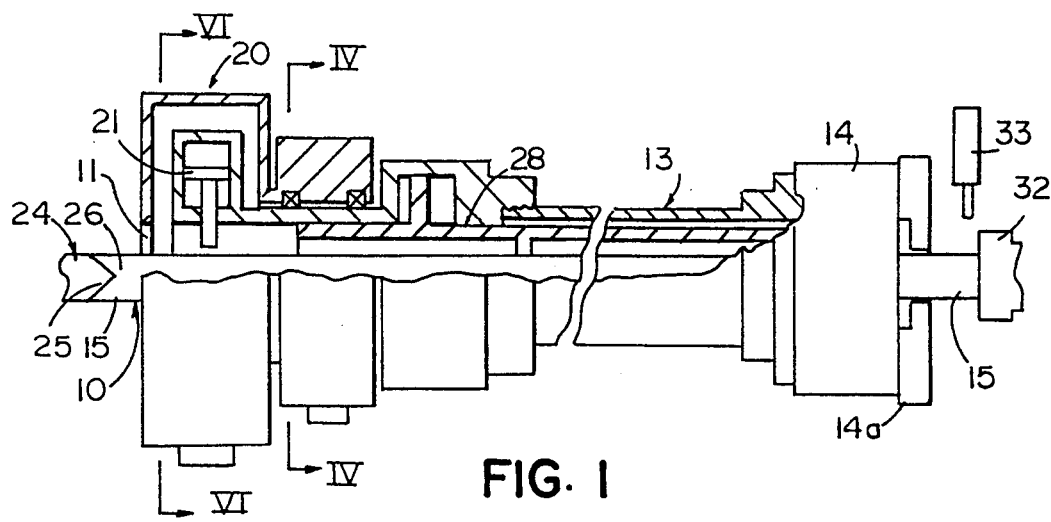
FIG. 1
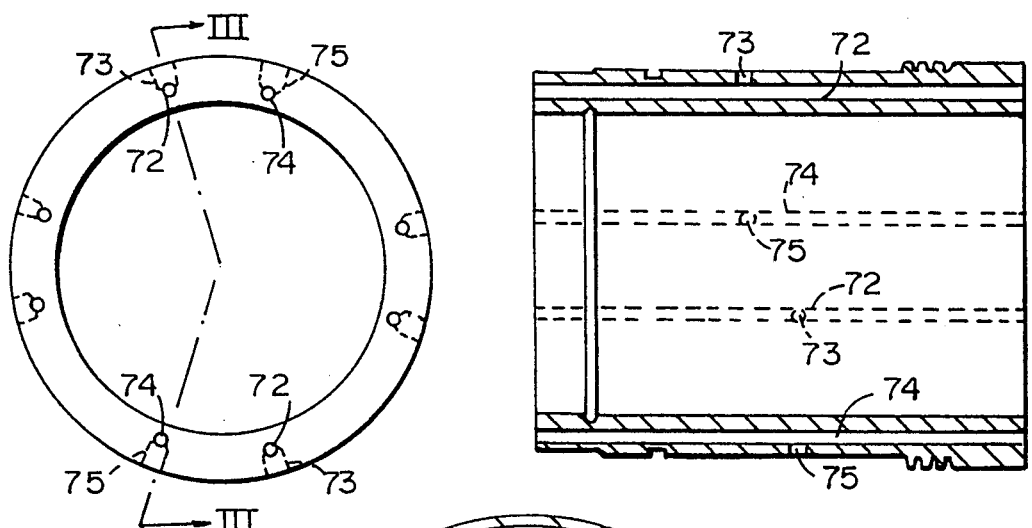
FIG. 4
FIG. 3
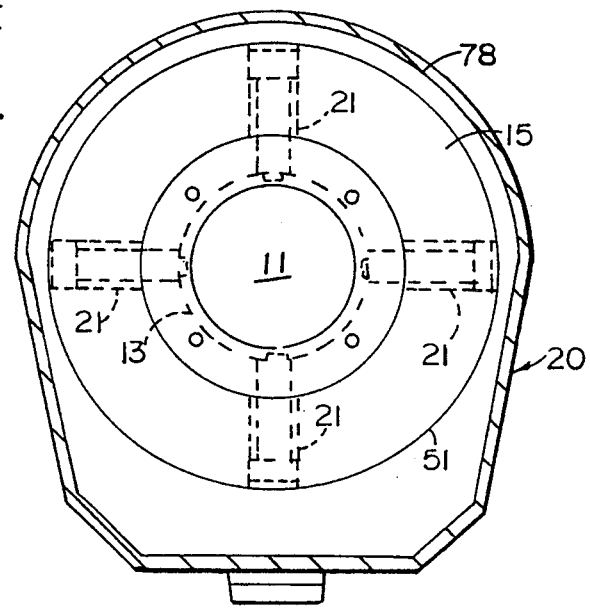
FIG. 6

THROUGH HOLE AND BAR FEED SUPPORT

BACKGROUND OF THE INVENTION

This invention provides a means of holding and supporting rod or tube stock while it is held and rotated by a collet or chuck during machining. Such rod and tube stock, at least initially, is of substantial length and may not have a center line which, lengthwise of the stock, is an unvarying straight line. Thus, the portion of the stock which extends rearwardly from the collet or chuck can be caused to flex radially during rotation. Even if the centerline of the stock is straight, high speed rotation can initiate lateral flexing which, once started, can be caused to increase in intensity. This has resulted in some products machined from the stock being out of tolerance and, therefore, unacceptable. The flexing or whipping of the tail end of the stock causes serious and excessive wear of the equipment. Further, it is hazardous. To avoid this situation, a significant portion of the rod or tube stock frequently has not been used or was used in another process or became scrap and was returned for remelt. This has been a particularly vexing and expensive problem contributing materially to the cost of the acceptable parts which have been produced.

BRIEF DESCRIPTION OF THE INVENTION

The invention provides a means of preventing the generation and amplification of oscillatory motion of the end portion of the stock extending rearwardly from the chuck. It accomplishes this purpose by gripping the bar stock as it enters the machine at a point substantially spaced from where the stock enters the collet or chuck. At this initial entry point, the stock is positively gripped by means which rotates with the stock. This gripping of the stock, as it initially enters the machine, does not at this point attempt to correct any eccentricity the centerline of the stock may have. Rather, it stabilizes the stock by suppressing and controlling its radial motion and thereby prevents magnification of any eccentricity it already may have. This suppresses the generation of the whipping motion of the stock, both prior to its entry into the machine and after it has entered the machine's spindle. By doing this, it prevents the generation of the eccentric forces which heretofore have, at this point in the use of the stock, become such as to negate the collet or chuck's ability to accurately machine the stock. Stated differently, the invention provides a means for stabilizing the trailing portion of the stock so that the oscillations or eccentricities heretofore transmitted to the equipment while the machining was being carried out are suppressed and all or almost all of the stock can be successfully machined within the required tolerance range.

BRIEF DESCRIPTION OF THE DRAWINGS

FIG. 1 is a schematic side elevation view of bar stock being supplied to a collet or chuck using this invention;

FIG. 3 is a longitudinal, sectional elevation view of the liner for the bar feed and support section of the invention;

FIG. 4 is a rear end elevation view of the liner;

FIG. 6 is an enlarged, fragmentary sectional view of the valve assembly controlling the collet or chuck jaws;

FIG. 8 is a diagrammatic representation of the hydraulic means controlling the operation of the stabilizing section.

DESCRIPTION OF THE PREFERRED EMBODIMENT

Figure 2:
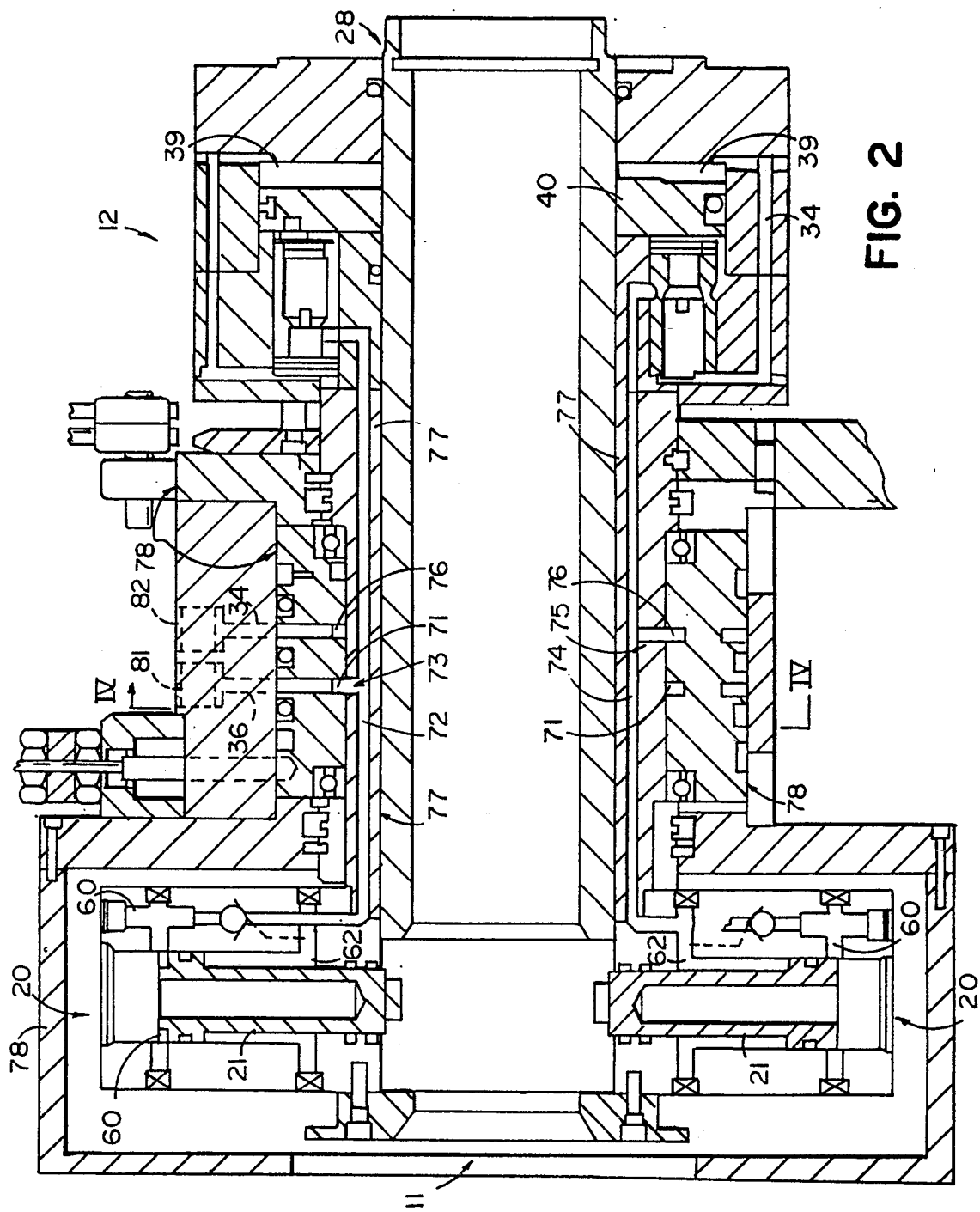
FIG. 2 is a sectional elevation view of the bar feed.

In the conventional stock feed for a through-hole machine tool, the stock 10 is moved in precisely measured increments through a hole 11 in the bar feed and support section 12 into the tubular spindle 13 of the equipment which will hold it during machining, such as by a collet or a chuck 14 (FIG. 1). The stock can be either rod or tube depending on the design of the part to be made. Because the stock from which the parts are machined is not necessarily completely straight, and even if it is straight, the tail or trailing end portion 15 can develop eccentricity. Since the stock is being rotated during machining any eccentricity, even though minor when the stock is stationary can be greatly amplified by centrifugal force. Increased operating speed of the equipment magnifies this problem. Heretofore, machines have been designed with equipment which was intended to straighten the stock and, therefore, eliminate or at least reduce the eccentricity to an acceptable level. However, as the need for products having a greatly reduced range of acceptable tolerance variation coupled with faster production schedules, these attempted solutions have failed to solve the problem.

This invention provides a stock engaging, support and stabilizing section 20 (FIG. 1) at the point of entry of the stock into the machine. This stabilizing section 20 has four equally spaced bar or stock support engaging pistons 21 shown in a retracted position indicated in dashed lines in FIG. 7, and shown in an extended position in FIG. 8. When engaging pistons 21 are activated, that is extended as indicated by dashed lines in FIG. 8, grip the stock 10 and positively hold it against any type of eccentric movement which might be centrifugally induced by rotation of the stock. This clamping action positively grips and locates the stock 10 as it enters the feed support section 12. The pistons 21 are not designed to correct any eccentricity in the stock they grip. Instead, the support pistons 21, upon contacting the stock, grip it with equal force being applied at ninety degree spaced points around the stock. Each individual piston 21 is capable of independent movement radially of the stock to assure positive gripping of the stock with equal restraining force in all four directions. Thus, minor variations in the centerline of the stock can be accommodated. However, as the stock is rotated, the pistons positively prevent any increase in the amount of eccentricity. Pistons 21 also prevent any lateral deviation of the stock in the section suspended between the pistons 21 and the jaws of the collet or chuck 14 passing rearwardly toward the feed bar or ram 24 which engages and provides stabilization of the inner end of the stock. Thus, the feed bar 24, which has a pointed end 25 engaging the conical recess 26 in the end of the stock 10, is able to prevent centrifugally induced increase in eccentricity such as might occur if the bar were not positively held by the stabilizing section 20 as it enters the equipment.

As the stock 10 passes through the support section 12 and the tubular spindle 13 (FIG. 1), it is guided to a position where it is gripped and held by the jaws 14a of the collet or chuck 14. These jaws 14a locate the stock's central axis concentric with the axis of rotation of the collet or chuck and thus precisely centered with respect to the tool or tools 33 (FIG. 1) which are to be used to machine it. The chuck or collet is not illustrated in detail since it is conventional such as those illustrated in U.S. Pat. Nos. 3,858,893, 3,984,114, 4,094,521, 4,130,290, and 4,249,459.

The stock, immediately after passing through stabilizing section 20, enters bar transport section 12 which includes the sleeve 28 (FIG. 2) from which the stock is delivered into the tubular spindle 13 through which it passes into the space between the jaws 14a of the collet or chuck 14 which clamp, accurately center and position the stock for machining. These jaws are not illustrated since they are conventional.

Machines of this type are normally designed to machine stock of various diameters. When the diameter of the stock was changed, heretofore the sleeve 28 and tubular spindle 13 had to be replaced with ones having a central opening which seats closely around the stock of the new diameter. Failure to do this, left the stock free to generate eccentric motion resulting in a whipping action, the intensity of which increased with the length of the stock remaining to be moved into position to be gripped by the collet or chuck jaws. Even though the end of the stock was engaged by a ram or bar feed 24, the stock's eccentricity intensified the whipping as it was being rotated during machining. This whipping action also accentuated and increased any eccentricity the stock may have had. This action seriously impaired or even made it impossible to hold acceptable tolerances. This was true even though the stock was supported both by the jaws of the chuck 14 and by the bar feed 24 at the opposite end because the distance between these supports allowed significant oscillation to occur.

This invention not only overcomes this problem by positively clamping and holding the stock not only at the chuck or collet but also at the stabilizing section 20 (FIG. 1). The stock is positively held by the collet 14 or chuck jaw and also by the pistons 21 and at its entry or inner end. At these points of support, the stock is tightly clamped and these points of support are substantially spaced lengthwise of the stock. Further, the stock continues to be supported at its trailing end by the ram 24. Thus, the ability of the stock to flex and generate a whipping action is suppressed. Further, the need to closely confine and radially support the stock is eliminated. Therefore, the invention makes it unnecessary to closely confine the stock 10 in the area between the pistons 21 and jaws of the collet or chuck. Also, the time consuming and laborious job of replacing the sleeve 28 and the liner of the spindle 13 is eliminated when stock of a different diameter is to be machined since a sleeve of a single inside diameter can be used for a wide range of stock diameters. This reduces down time for machine adaptation as well as the cost and storage of the various sizes of sleeves needed to accommodate changes in stock size.

When the master control for the machine senses the completion of a machining cycle, it signals the collet or chuck 14 to release the stock 10. The master control also signals the stabilizing section to retract the bar engaging pistons 21. This is accomplished by shifting the valve 42 (FIG. 8) to connect the inner end of the cylinder housing 39 and the pistons 21 to the reservoir through the return line. The valve 42 is illustrated in this shifted position in FIG. 2.

When the stock 10 to be machined is to be moved forward into position before the tool or tools which are to shape it into the desired product, the stock, while released by the equipment, is moved into position to be gripped by the collet or chuck. This movement is effected by thrust imparted to the stock by the bar feed or ram 24. The distance the stock is so moved depends upon the design of the product being made. There are a number of well-known means for doing this, one of which, for example, is a stop (FIG. 1) 32 which precisely positions the stock before the tool 33 or tools which are to machine it. The stop 32, having completed its function, can then be withdrawn. This stop is not part of this invention and, therefore, is not disclosed in detail.

When the length of stock 10 to be machined has been accurately positioned lengthwise for machining, the jaws 14a of the collet or chuck are closed, precisely positioning the stock both as to the centerline of rotation of the stock and as to the tool 33 or tools which are to machine it.

This invention is designed to stabilize, support and maintain the axial alignment of the rear or remaining portion of the stock which extends rearwardly from the collet or chuck 14. To accomplish this, the stock must be gripped and positively held against radial flexing. This is effected immediately after the jaws 14a of the collet or chuck 14 have engaged and centered the stock by causing the pistons 21 of the stabilizing section 20 to also grip the stock.

FIG. 8 diagrammatically illustrates the operational sequence of the valves which control the position of the jaws, jaws 14a and pistons 21 of stabilizing sections. For the purpose of this description, it is assumed that the jaws of the collet or chuck are open, the pistons 21 retracted and the desired length of stock has been advanced into position for machining but not changed. Piston 40 (FIGS. 2, 8) is an integral part of the sleeve 28 is connected to the tubular spindle 13 which, in turn, is operatively connected to the jaws of the collet or chuck. Lateral movement of sleeve 28 causes jaws 14a of the collet or chuck 14 to open and close on the stock 10 in a known manner. Lateral movement of piston 40 therefor controls the opening and closing of jaws 14a. As long as the piston 40 remains in its retracted position, that is to the left, as it would have to be as illustrated in FIG. 2 when the jaws are open, the jaws will remain in article release position. The distance the piston 40 is moved can vary from one design to another. However, in the preferred design, this movement is about three eighths of an inch. It will also be understood that, under normal operating conditions, the piston, when shifted to jaw closing position preferably does not reach the end of its chamber. Its movement to jaw closing position will cease when the resistance to clamping by the jaws balances the thrust provided by the hydraulic fluid. To close the jaws, fluid under pressure is introduced to that portion of the annular chamber 39 housing to the left of the piston 40 to force piston 40 to the right in the view shown in FIG. 2 and the hydraulic fluid in the portion of the chamber 39 to the right of piston 40 (FIG. 2), is forced back to the opposite side of the piston 40 through line 34 and trap valve 42.

As illustrated in FIG. 8, hydraulic fluid from the pump 37 is introduced through the trap valve 41 and line 34 to the right left of piston 40. This exerts hydraulic pressure against the piston 40, shifting it to the right, as viewed in FIG. 2. Since piston 40 is integral with the sleeve 28, its movement also moves the sleeve to the right. Fluid to the right of the piston will exhaust through channel 44. This movement can vary from one design to another. However in the preferred design, it is about three eighths of an inch.

The piston 40 is an annulus as illustrated in FIGS. 2 and 8. Thus, the movement of the piston 40 also will generate hydraulic pressure to open the trap valve 44. The trap valve 45 is identical to the trap valve 44 but lengthwise of the equipment is directionally reversed. Thus, when then the trap valve 46 is closed, as illustrated in FIG. 8 and the jaws of the chuck are in work clamping position, this condition will continue until either means on the equipment or an operator generates a signal that will cause the directional valve 42 to shift to the left, as illustrated in FIG. 2. When the valve 42 shifts to the left or stock release position, the stock is released and the valve elements of the stabilizing section 20 are also released. When this has been accomplished, the stock 10 can once again be moved forward to present a new segment thereof for machining.

Figure 7:
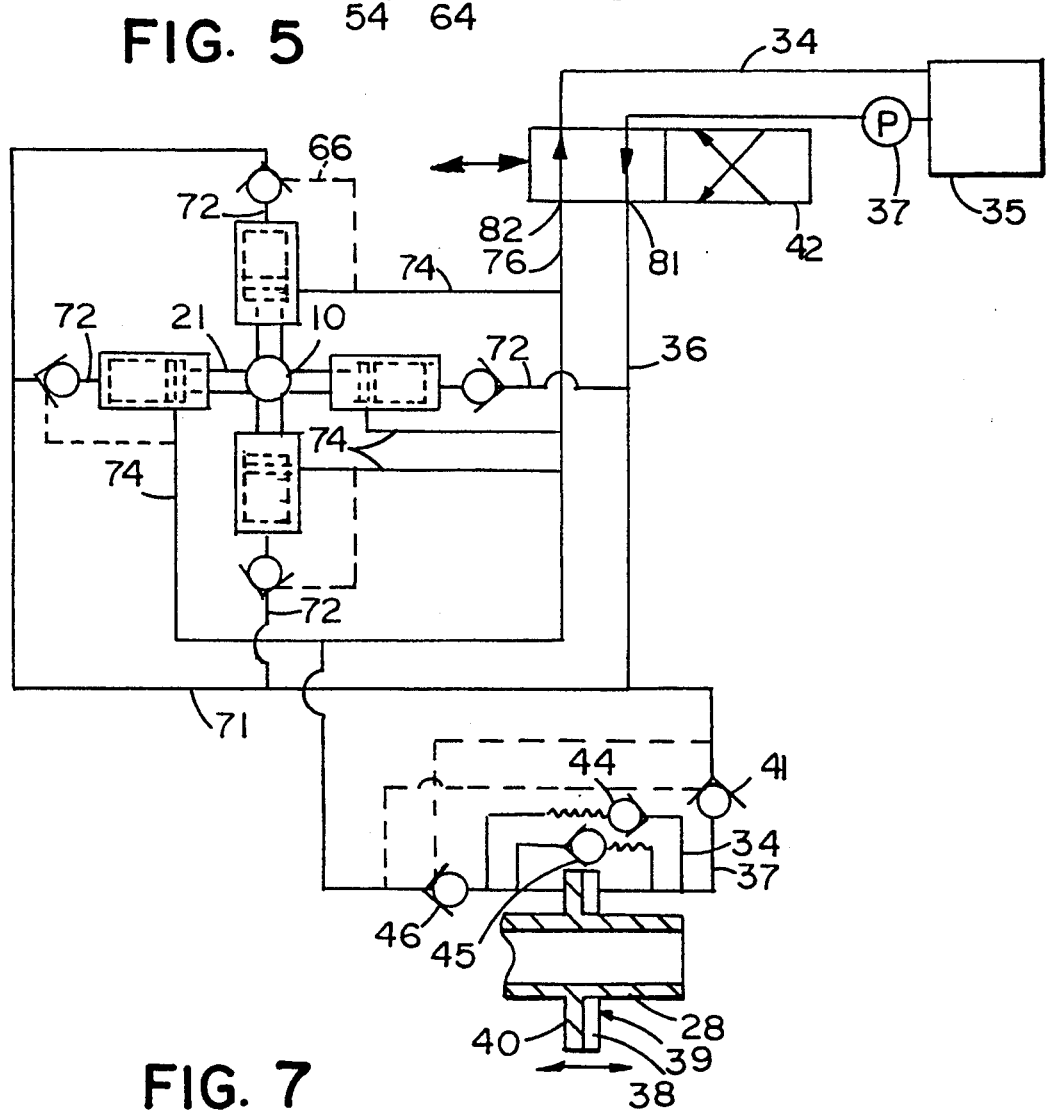
FIG. 7 is a sectional, elevation view taken along the plane VII—VII of FIG. 1.

Coordinated with the advance of the stock and its machining is the operation of the stabilizing section 20. This controls the lateral or radial deflection of that portion of the stock which is not immediately adjacent the chuck or collet. To stabilize this portion of the stock, the stabilizing unit or section 20 is provided and located to engage the stock 10 as it enters support section 12 and passes on through the tubular spindle 13. The stabilizing section is an annular body having four radially operating stock clamping pistons 21 arranged in a plane normal to the axis of the stock (FIG. 7). It will be recognized that the number of pistons 21 could be reduced to three or increased to more than four, provided their spacing is such that they are arranged symmetrically around the axis of the stock 10. The arrangement illustrated in FIG. 7 is believed to be the most effective design for providing adequate support for the stock 10 coupled with sufficient structural strength to positively support and grip heavy stock such as four and one half inch rod stock in a machine operating at the speeds currently considered necessary to satisfy the demands of present day operating technology and productivity.

Figure 5:
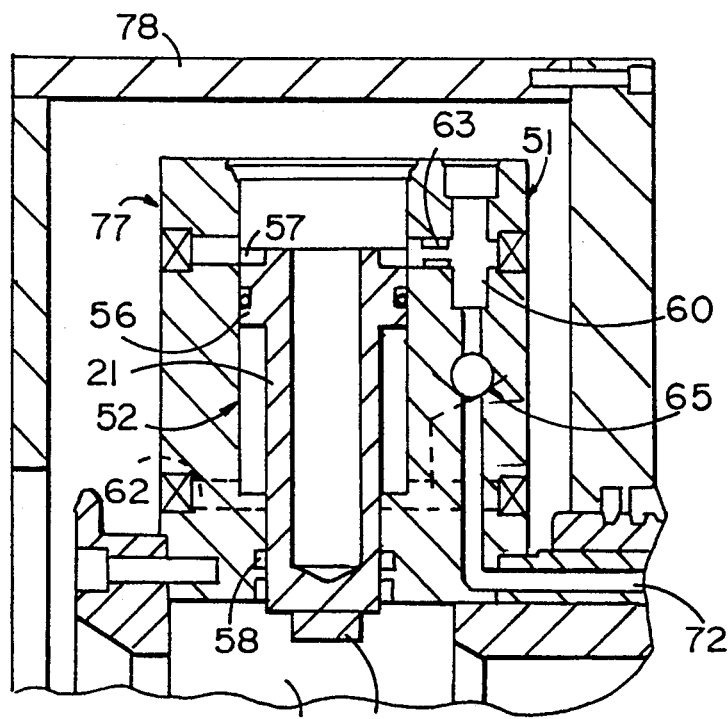
FIG. 5 is an enlarged fragmentary sectional view of one of the clamping cylinders for the stock.

The support and stabilizing section 20 has four piston-like clamping assemblies 21 which, as illustrated in FIG. 5 that are identical and are mounted the annular body contained within the housing of the stabilization unit of such. The annular body is mounted on and secured to the end of the support section 12 (FIG. 1) and is stationary while the four clamping assemblies rotate about the central axis of the stabilizing section 20. Since the clamping assemblies 21 are identical, the description of one of them is to be considered as applicable to all four of them.

Each of the clamping assemblies 21 is mounted in a cylindrical cavity 53 (FIG. 5) in the body 51, the central axis of which is co-axial with the axis of rotation of the support section 12 and spindle 13 and thus of the body 51. Each of the pistons 21 has a gasket equipped flange 56 close to its radially outer end (FIG. 5). The inner end of the piston 21 passes through the radially inner wall of the body housing the piston into the housing's central cavity 54 through which the stock 10 passes as it enters the equipment. As the piston does so it passes through the ring seals or gaskets 58. When fluid is introduced under pressure into the outer end of cavity 57, the piston 21 is forced to move inwardly until its inner end 64 seats against the stock 10 entering the machine through the central cavity 54 (FIG. 5). This fluid enters the cavity 57 through the port 60. As the fluid enters the port 60, hydraulic fluid in the cylindrical chamber 57 surrounding the piston 21 between the flange 56 and the inner end of the chamber 57 is exhausted through the port 62 (FIG. 5). The fluid entering the port 60 passes through a restrictor 63 in the entry passage between the port 60 and the cavity 57. The purpose of this restrictor 63 is to delay the engagement of the piston 64 with the stock until after the collet or chuck 14 (FIG. 1) has fully gripped the stock and centered it. Thus, clamping of the stock by the pistons 64 is sequential to the stock engagement by the collet or chuck but the time lapse between these actions is only a few seconds.

In the event of a failure of pressure in the hydraulic system, the check valve 65 closes automatically, preventing immediate escape of fluid from behind the extended piston 64. These check valves each have a bleed line 66 (FIG. 8) which allows gradual release of the trapped fluid such that after a predetermined period, such as five to ten minutes, the stock 10 will automatically be released. This allows enough time for the operation of the equipment to cease before release of the stock. These effect bleed line release of enough fluid that the equipment can be serviced safely.

The hydraulic fluid for operating the pistons 21 of the stock stabilizers is provided from the same source and at the same pressure as that used to open and close the jaws of the chuck. This is diagrammatically illustrated in FIG. 8. The fluid inlet port 60 (FIG. 4) communicates with the circumferential channel 71 (FIG. 6) which in turn connects to all four of the conduits 72 only two of which are shown in FIG. 3, which supply the ports 60 (FIG. 5) which advance the pistons 21. Both of the conduits 71 and 76 extend circumferentially around the cylindrical jacket 77 (FIG. 5) which rotates with the stabilizing section 12. While the jacket 77 rotates with the stabilizing section (FIG. 1), the annular housing block 78 does not and is stationary (FIG. 5). Fluid for the channel 71 is introduced from the source 35 through the pump 37 and valve 42 (FIG. 8) to each of the conduits 72 (FIG. 2) and returned through the conduit 76. The conduit 71 and thus conduits 72 are connected to a port 81 which supplies fluid to conduits 72. The conduit 76 is connected to port 82, similar to port 81. It is shown schematically in FIG. 8. The conduit 81 thus serves all of the conduits 72 while the conduit 82 serves all of the conduits 74.

It will be understood that the fluid for operating the jaws of the machine is supplied through conduits and communicate with the conduits operating the valves actuating the jaws of the chuck. Further, these are operated simultaneously with and by the same hydraulic fluid which advances and retracts the pistons 21. The valving system for operating the chuck jaws is illustrated in FIG. 6. The simultaneous operation of the jaws 14a of chuck 14 must be coordinated with that of the stabilizing section 20.

As illustrated in FIG. 6, to move the jaws to clamping position, fluid is supplied through the conduit 90 and passes through a trap valve 42 and conduit 34 to chamber 42 forcing the piston 40 to the right, as illustrated in FIG. 6. At the same time, fluid passes through trap valve 92 and the release valve and is returned to source through conduit 94.

When the jaws are to be opened, fluid is introduced through conduit 72, passes through, opens the valve 95 and forces the piston 40 to the right, as illustrated in FIG. 6. At the same time, fluid is exhausted from the chamber 39 through conduit 34 and trap valve 42 to conduit 90. Since the direction of flow and the timing of valve operation are interconnected with that of the hydraulics operating the pistons 21 of the stabilizing section, the operations of the two coordinated.

The preceding description of one of the clamping pistons for the stock 10 is to be considered as applicable to all of the stock clamps since they are identical and all operated from a common source of hydraulic pressure. This latter feature allows the arrangement to accommodate itself to stock which may be slightly bowed or otherwise irregular. Since each of the pistons are identical in size and design and are subjected to the same fluid pressure, should one of the pistons be unable to extend as far as others, this will cause no difficulty because each will apply the identical gripping pressure to the stock so that the forces acting on the stock and stabilizing its position are identical, and thus there will be unity of circumferentially applied force to the stock.

The invention provides means for holding and stabilizing stock of substantial length without the problems incident to whipping of the stock during machining. Thus, it contributes not only to safety but also makes it possible to use stock of greater length while reducing waste due to inability to efficiently use all the stock. It also eliminates the necessity for enclosing the stock in a close fitting tubular housing as it passes through the machine. This greatly increases the capacity of the machine without costly and time consuming shut down to adapt the machine to stock of different diameters.

These and other advantages of the invention will be recognized by those knowledgeable in the machining art.

I claim:

1. An apparatus for controlling the radial flexing of bar or rod stock entering a through-hole stock feed support of a machine tool, said machine tool including a discharge end and a stock machining device at the discharge end thereof, said stock feed support having an entry end and said stock having an axis of rotation while in said machine tool, said apparatus comprising:

an annular grip at said entry end of said stock feed support, said annular grip having a plurality of equally spaced stock gripping members arranged circumferentially of said stock with said stock gripping members spaced from said stock machining device, and an annular grip support adapted to rotatably support said stock gripping members and provide for the rotation thereof concentrically of the axis of rotation of said stock presented for machining;

a separate piston provided and adapted to actuate each of said stock gripping members, a source of liquid under pressure common to all of said pistons, and a check valve between each of said pistons and said common liquid source adapted to prevent return of liquid from said pistons to said liquid source in the event of failure to maintain pressure on said liquid.

2. Apparatus for controlling a supply of elongated machinable stock having an axial length and a centerline, while said stock is in a machine which rotates said stock about an axis of rotation during machining, said machine including a stock entry port and a stock engaging chuck adapted for gripping one end of said stock adjacent where said stock will be machined and said chuck having an axis of rotation, comprising:

a stock gripper disposed at said stock entry port, said stock gripper being substantially spaced from said chuck along said stock axial length, said stock gripper having a plurality of gripping elements arranged in a common plane normal to said axis of rotation of the stock and at equally spaced intervals circumferentially of said stock, means for moving each of said gripping elements radially into engagement with the stock to exert an identical radially applied force against the stock, each gripping element being capable of a different length of radial movement in response to variations in the position of the centerline of the stock in the portion thereof contacted by said gripping elements, means for supporting said gripping elements for rotation with said stock concentrically of the axis of rotation of said chuck, whereby said gripping elements control and limit the amount of increase in radial displacement of said stock resulting from rotation of the stock, between said chuck and said gripping elements;

said stock gripping elements moving means including hydraulic means supplied by a source of hydraulic pressure for radially moving said stock gripping elements into and out of an extended stock gripping position, means for preventing release of hydraulic pressure acting on said stock gripping elements when said stock gripping elements are in said extended stock gripping position in the event of unintended failure of the hydraulic pressure being supplied to said hydraulic means.

3. Apparatus for controlling a supply of elongated machinable stock having an axial length and a centerline, while said stock is in a through-hole machine which rotates said stock about an axis of rotation during machining, said machine including a stock entry port and a stock engaging chuck or collet adapted for gripping one end of said stock adjacent a region where said stock will be machined and said chuck or collet having an axis of rotation, comprising:

a stock gripper disposed at said stock entry port, said stock gripper being spaced from said chuck or collet, said stock gripper having a plurality of gripping elements arranged in a common plane normal to said axis of rotation of said stock and at equally spaced intervals circumferentially of said stock, means for moving each of said gripping elements radially into a stock gripping position in engagement with said stock to exert an identical radially applied force against said stock, each gripping element being capable of a different length of radial movement in response to variations in the position of the centerline of the stock in the portion thereof contacted by said gripping elements, means for supporting said gripping elements for rotation with said stock concentrically of the axis of rotation of said chuck or collet, fluid means for holding said gripping elements at said stock entry portion in said stock gripping position, said fluid means including means for supplying fluid pressure to said gripping elements from a fluid system having a fluid supply, at least one check valve element in said fluid system adapted for preventing release of said fluid in the event of unplanned fluid pressure failure in the fluid supply portion of said fluid system.

4. Apparatus for machining a segment of machinable elongated stock, comprising:
   means for machining said stock;
   first gripping means for gripping said stock adjacent said machining means, said first gripping means including a chuck rotatable about an axis;
   an elongated tubular spindle having one end coupled with said chuck and through which said stock is moved incrementally to said chuck for machining;
   second gripping means for gripping and controlling radial flexing of said stock when said stock is rotated during machining;
   said second gripping means being spaced lengthwise of said spindle remote from said chuck and having a plurality of stock engaging members mounted in a common plane circumferentially of said stock and adapted for radial movement between stock engaging and stock release positions, said stock engaging members being rotatably mounted and supported for rotation about the same axis as said chuck;
   means including a source of hydraulic pressure resulting from hydraulic fluid for providing clamping force to said stock engaging members acting against radial movement thereof during rotation of said stock, and for hydraulically reciprocating said stock engaging members between a stock gripping position and a stock release position, whereby said stock is held against radial flexing due to circumferential forces generated by said rotation acting on said stock;
   said chuck having stock gripping jaws;
   means for communicating to said source of hydraulic pressure the position of the jaws of said chuck and for causing said stock engaging members to shift to said stock gripping position, and means for delaying the engagement of said stock by said stock engaging members until said gripping jaws have clamped said stock.

5. Apparatus as defined in claim 4 wherein said delaying means is a flow rate restrictor acting on the hydraulic fluid reciprocating said engaging members.

6. Apparatus for machining a segment of machinable elongated stock, comprising:
   means for machining said stock;
   first gripping means for gripping said stock adjacent said machining means, said first gripping means including a chuck rotatable about an axis;
   an elongated tubular spindle having one end coupled with said chuck and through which said stock is moved incrementally to said chuck for machining;
   second gripping means for gripping and controlling radial flexing of said stock when said stock is rotated during machining;
   said second gripping means being spaced lengthwise of said spindle remote from said chuck and having a plurality of stock engaging members mounted in a common plane circumferentially of said stock and adapted for radial movement between stock engaging and stock release positions, said stock engaging members being rotatably mounted and supported for rotation about the same axis as said chuck;
   means for supporting said stock engaging members against radial movement thereof during rotation of said stock, whereby said stock is held against radial flexing due to circumferential forces acting of said stock;
   a source of pressurized hydraulic fluid and conduit connecting each of said stock engaging members to said source, a check valve in said conduit arranged to prevent hydraulic fluid urging said stock engaging members into stock engagement from returning toward said source in the event of a major drop in fluid pressure between said source and said check valve.

7. Apparatus as defined in claim 6 wherein a separate fluid conduit is provided for each stock gripping member and a separate check valve is provided in each of said fluid conduits.

8. Apparatus as defined in claim 7 wherein a bypass conduit is provided at each of said check valves to permit gradual release of the hydraulic fluid over a predetermined period of time sufficient to enable termination of operation of said machining means by external means.

9. Apparatus for controlling radial flexing of elongated rod or tubular stock while said stock is being rotated during machining, comprising:
   stock gripping means for gripping and supporting said stock, a chuck having an axis of rotation and adapted for gripping the stock and rotating said stock during machining, said gripping means and said chuck being spaced lengthwise of said stock, a tubular spindle having one end operably coupled to said chuck through which the stock to be machined is moved incrementally to said chuck from said stock gripping means, said tubular spindle being of substantially greater inner diameter than the outer diameter of said stock, said stock gripping means being disposed at another end of said spindle remote from said chuck, said stock gripping means having a plurality of stock engaging members mounted in a common plane at equally spaced intervals circumferentially of said stock and means for simultaneous radial movement of said stock engaging members between a stock engaging position and a stock release position, means for supporting said stock engaging members for rotation about the same axis as said chuck, means for holding said stock engaging members against radial movement thereof during rotation of the stock, including means for hydraulically reciprocating between a stock engagement position and a release position whereby said stock is held against radial flexing due to circumferential forces generated by rotation of said stock and of said stock engaging members about a common axis.

10. Apparatus as defined in claim 9 wherein the chuck includes stock gripping jaws, means for communicating to a source of hydraulic pressure for said stock engaging members the position of the jaws of said chuck and for causing said stock engaging members to shift to a stock gripping position, and means for delaying engagement of the stock by said stock engaging members until said gripping jaws have clamped said stock.

11. Apparatus for controlling radial flexing of elongated rod or bar stock is being rotated by a machine during machining, said machine having a source of said stock and having a tool for machining said stock, and said machine having a chuck adjacent said tool for clamping the stock and rotating it while the stock is being machine, comprising:
   means disposed between said chuck and the source of the stock for stabilization of said stock, said stock stabilization means having a plurality of equally spaced stock engaging members arranged circumferentially of said stock and means for moving said stock engaging members simultaneously into and out of engagement with said stock at areas of contact, means for mounting said stock engaging members for rotation with said stock and for causing said stock engaging members to apply to said stock a radial pressure of the same magnitude at all areas of contact between said stock engaging members and said stock, said radial pressure being of insufficient magnitude to reposition the centerline of said stock but being of sufficient magnitude to prevent any increase in radially induced deflection of said stock generated by the rotation of the stock during machining, and said stock engaging members being reciprocated between a stock clamping position and a stock release position by means applying hydraulic pressure of equal magnitude to each of said stock engaging members.

* * * * *

UNITED STATES PATENT AND TRADEMARK OFFICE
CERTIFICATE OF CORRECTION

PATENT NO. : 5,343,789

DATED : September 6, 1994

INVENTOR(S) : William F. Richardson

It is certified that error appears in the above-indentified patent and that said Letters Patent is hereby corrected as shown below:

Column 2, line 34
"support engaging" should be --engaging support--;

Column 3, line 14
After "jaws" insert --14a--;

Column 4, line 33
"sections" should be --section 20--;

Column 4, line 37
"changed" should be --clamped--;

Column 4, line 38
"Piston 40" should be --The piston 40--;

Column 4, line 38
After "sleeve 28" insert --and--;

Column 4, line 66
Delete "right";

Column 5, lines 48 and 49
"of such" should be --or section--;

Column 6, line 39
After "section" insert --12--;

UNITED STATES PATENT AND TRADEMARK OFFICE
CERTIFICATE OF CORRECTION

PATENT NO. : 5,343,789
DATED : September 6, 1994
INVENTOR(S) : William F. Richardson It is certified that error appears in the above-indentified patent and that said Letters Patent is hereby corrected as shown below:

Column 10, line 58, claim 11
    After "bar stock" insert --while said stock--; and Column 10, line 63, claim 11
    "machine" should be --machined--.

Signed and Sealed this

Thirty-first Day of October 1995

*Attest:*

BRUCE LEHMAN

*Attesting Officer*    *Commissioner of Patents and Trademarks*